UNITED STATES PATENT OFFICE.

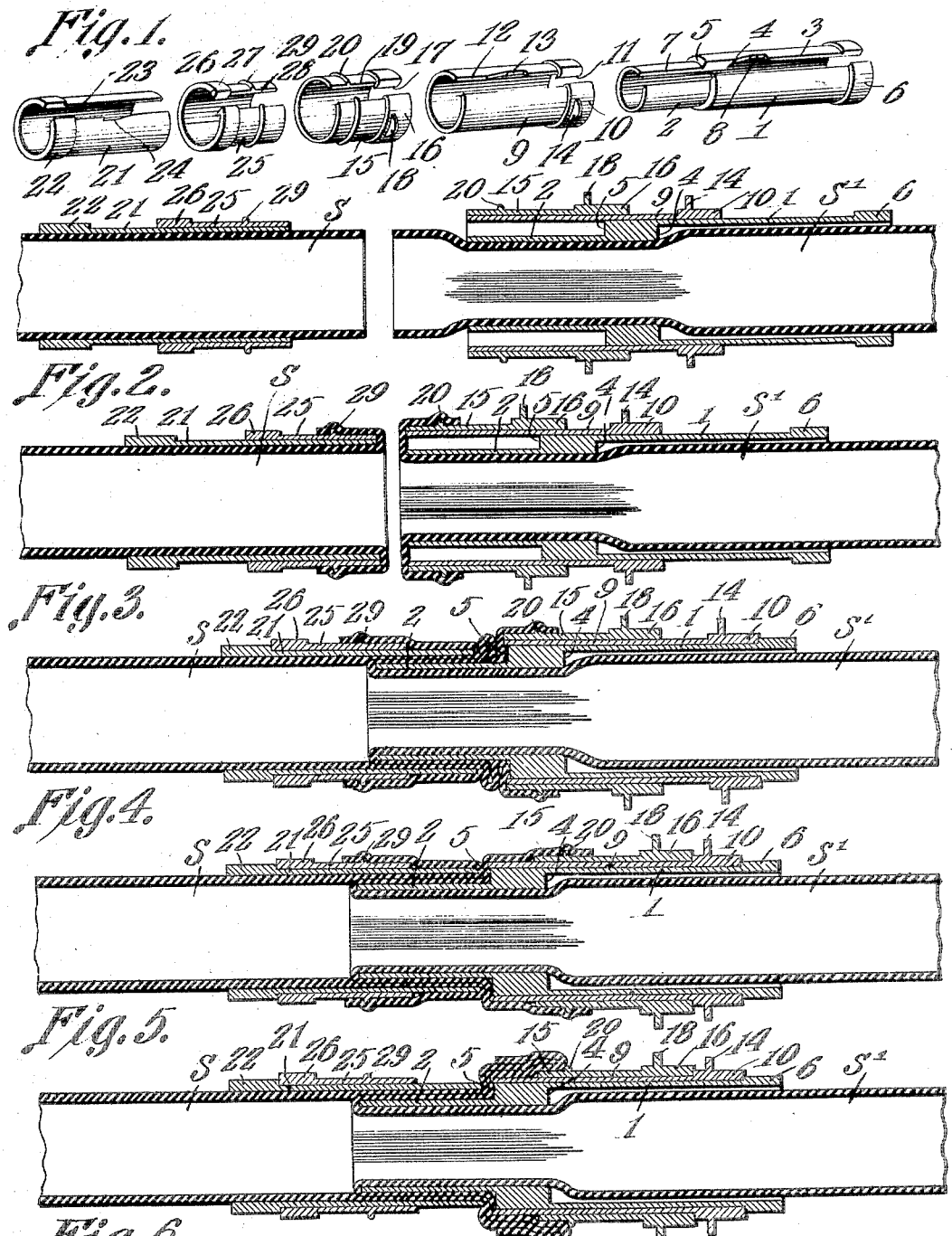

EDWARD A. FRANKLIN, OF AUSTIN, TEXAS.

ELASTIC-TUBE-SPLICING DEVICE.

1,081,299.  Specification of Letters Patent.  Patented Dec. 16, 1913.

Application filed May 31, 1912. Serial No. 700,733.

*To all whom it may concern:*

Be it known that I, EDWARD A. FRANKLIN, a citizen of the United States, residing at Austin, in the county of Travis and State of Texas, have invented a new and useful Elastic-Tube-Splicing Device, of which the following is a specification.

The present invention relates to improvements in elastic tube splicing devices, the primary object of the present invention being the provision of a novel form of device especially adapted for connecting the free ends of tubes, such as the inner tubes of automobile tires, the same consisting of a number of telescopic elements so constructed and arranged as to properly position the respective ends of the tubes with relation to each other so as to permit when the splice is made, the proper cementing of such ends in a plurality of circumferential layers or folds, the respective telescopic elements being so positioned as to properly hold the respective terminals of the tubes into co-active relation during the cementing thereof, yet permitting the easy removal of the tube from the elements after the ends have been properly connected together.

A further object of the present invention is the provision of a splicing device for inner tubes having a plurality of three members adapted to be positioned upon one terminal of the tube while the other telescopic members are connected upon the other terminal of the tube, all of said members being disposed for co-active relation to produce the desired folded and spliced ends and to retain such ends in the desired position during the cementing together of the folded and consequently reinforced ends.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings—Figure 1 is a perspective view of the various elements of the splicing device detached. Fig. 2 is a longitudinal sectional view through two abutting ends of an inner tube, with the splicing device in the position it assumes in carrying out the first and third steps of the process. Fig. 3 is a similar view to Fig. 2 with the splicing elements in the position they assume in carrying out the second and fourth steps of the splicing process. Fig. 4 is a similar view for carrying out the fifth and sixth steps of the splicing process. Fig. 5 is a similar view carrying out the seventh and eighth steps of the process. Fig. 6 is a similar view carrying out the final step before the removal of the splicing device from the cemented terminals of the tube.

Referring to the drawings, the splicing device consists primarily of the main tubular member 1 provided with the reduced tubular horn 2, each of said members being slotted longitudinally, as at 3, for the proper introduction and removal of the splice of the inner tube. The member 1 is provided with the annular shouldered portion 6 and with the intermediate portion providing the internal and external shoulders 4 and 5, the purpose of which will presently appear. The tubular member is further provided with the longitudinal slot 7 by means of which the tube to be spliced may be more readily inserted within the member, while one edge of the material of the slot as at 8, is recessed, the purpose of which will presently appear.

The member 9 is formed in the shape of a tube and is disposed to telescopically fit upon the enlarged portion of the member 1, the same being provided with the annular shouldered portion 10 provided with the two oppositely disposed and parallel cleats or flanges 11 which are in line with the edges of the longitudinal slot 12 which corresponds to the slot 3 of the member 1. One edge of the material adjacent to the slot 12 is recessed as at 13, said recess being similarly shaped to the recess 8 of the member 1. Diametrically disposed lugs or handles 14 are formed integral upon the enlarged annular shouldered portion 10 of the member 9 and constitute a means whereby the said member 9 is readily moved relatively to the member 1, as will presently appear in carrying out the splicing operation.

The tubular member 15 is disposed to be mounted slidably and exteriorly of the tubular member 9, the same being provided with the annular shouldered portion 16 having the parallel inwardly projecting flanges 17 which are similar to the flanges or lugs 11 of the member 9 and aline with the edges of the longitudinal slot 19, which corresponds to the slot 12 of the member 9. The diametrically disposed lugs or handles 18 are formed integral with the annular shouldered portion 16 of the member 15, while disposed circumferentially of the tubular portion 15 thereof intermediate of its ends, is the bead 20, the purpose of which will presently appear.

The members 1, 9 and 15 constitute the telescopic elements of the male splicing member of the device and are normally telescoped as clearly shown in Fig. 2, all of said elements being disposed for sliding movement relatively to each other and by reason of the recesses 8 and 13 are permitted a slight oscillatory movement, the purpose of which will presently appear.

The tubular member 21 is provided with an annular shoulder 22 which is normally disposed in opposite relation to the shoulder 6 of the member 1, said member 21 being slotted longitudinally as at 23 and provided with the recess 24 which is similar in shape to the recess 8 of the member 1 but is disposed upon the opposite side thereto. This member 21 fits telescopically within the tubular member 25, said tubular member 25 being provided with the annular shouldered portion 26 which is disposed to be adjacent the annular shouldered portion 22 of the member 21 when in nested or telescopic position, as shown in Fig. 2. The member 25 is provided with the two parallel lugs 27, which correspond to lugs 11 and 17 of the members 9 and 15, all of said lugs engaging their respective slots of the concentric members to prevent the outer members from rotating relatively to each other, thus retaining all of the respective longitudinal slots 3, 12, 19, 23 and 28 in alinement when the members are finally assembled in the positions, as shown in Figs. 4, 5 and 6.

Formed circumferentially and exteriorly of the tubular member 25, is a bead 29 which corresponds to and is of similar shape to the bead 20 of the member 15. These two members 21 and 25 are normally disposed as shown in Fig. 2 and through them is passed one terminal S of the inner tube which when in initial position with relation to the members 21 and 25 is as clearly shown in Fig. 2.

The operation and necessary method and process of splicing of the ends S and S' of the inner tube is performed as follows: The elements 1, 9 and 15 being positioned, as clearly shown in Fig. 2, with the lugs 11 of the member 9 riding in the slot 3 of the member 1, to prevent the circumferential movement of the member 9 relatively to the member 1, and the lugs 17 of the member 15 sliding in the slot 12 of the member 9 are in a position to receive the terminal of the inner tube S', said end being fed through the member 1 either by entrance through the slot 3 or through the end provided with the annular shouldered portion 6, the extreme end of the splice S' being extended beyond the end of the horn 2, the desired distance to permit of the folding back thereof upon and exteriorly of the end of member 15, as clearly shown in Fig. 3. This end is folded back so as to fit upon and project slightly to the right of the bead 20. The members 21 and 25 are now positioned to receive the splice S of the inner tube, whose end is projected slightly beyond the alined ends of the members 21 and 25, as clearly shown in Fig. 2, and is finally folded back so that the bead 29 is surrounded by the end, as clearly shown in Fig. 3. The female member of the splicing device, consisting of the elements 21 and 25 is now pushed so as to completely surround the horn 2 of the male member.

Assuming the parts to be in the position as shown in Fig. 2, in which the splice S has been threaded through the left hand member of the device, while the splice S' has been threaded through the right hand member thereof, the extended end of the splice S is turned backwardly and beyond the circumferential bead 29 to assume the position as shown at the left in Fig. 3. The extended end of the splice S' is also turned backward and over the end of the member at the right so that the same engages the bead 20 to assume the position as shown at the right in Fig. 3. The sleeve 1 carrying the horn 2 of the member at the right in Fig. 3 is now projected forwardly to cause the parts to assume the position as shown at the right in Fig. 4, while the sleeve 25 of the member at the left as shown in Fig. 3 is moved to the position as shown at the left in Fig. 4. The projected end of the horn 2 with the elastic body of the splice on both sides thereof, is now introduced into the turned back end of the splice S of the member at the left so that the parts will assume the position, as shown in Fig. 4, the exterior portion of the turned over or lapped end of the splice S due to the frictional engagement therewith of the adjacent or concentric portion of the splice S' is moved to produce the circumferential bulge, as viewed in Fig. 4, so that when the sleeve 16 is moved to the position as shown at the right in Fig. 5, such surplus portion of the splice will extend upon the then projecting end of the sleeve 9 to assume the position as clearly shown in Fig. 5, the parts of the member at the left in Fig. 5 assuming the same position as shown at the left in Fig. 4. While the parts are in this interlocking relation, the end of the splice S, disposed in overlapping relation to the sleeves 21 and 25 of the member at the left, is moved or rolled toward the member at the right as viewed in Fig. 6, having its terminal portion placed upon the overlapping portion of the splice S' upon the sleeve 9 and the adjacent portion of the sleeve 15. The extreme end of the splice S' being the longer than the extreme end of the splice S in this folded position, is now folded to the left as shown in Fig. 6, and thus overlaps the end of the splice S, the overlapping or the adjacent portions of the various layers at this point having been previously cemented so that three thicknesses of the tube are provided at this point of cementing, as clearly shown at the bulged or overlapped portion in Fig. 6. To remove the spliced tube, the sleeves 1, 9 and 15, which constitute the male member, or the one at the right, are withdrawn from the female member or the member at the left, and that both members are thus separated. The tube is now passed through the longitudinal slots formed in all of the sleeves of both members and is thus completely spliced and free of the splicing device. In this way it will be seen that a treble splice or fold is provided at the meeting ends of the inner tube and that the meeting ends interlock to hold each other and in themselves be properly held in such connected position, so that after the cement has properly dried, the various elements may be moved relatively to the tube, and as the respective longitudinal slots of the members are alined, the tube is readily removed.

By reason of the sliding telescopic connections between the various elements of the device, the necessary stretching and retaining of the tube during the process of folding and cementing is carried out, so that when the splice is finally made and dried, there is no undue buckling of the material at such points, as the stretching of the respective terminals of the tube has been identical, so that the contraction thereof, after the removal of the device from the tube will be approximately the same. By reason of the recesses 8, 13 and 24 and their corresponding or registering lugs 11 and 17 and one of the lugs 27, the various elements are locked against inward movement when the splice is being formed during the various steps as above outlined, the recesses also permitting a slight rotary or oscillatory movement of the various members with relation to each other. This will permit of the easy removal of the said members and the consequent sliding of the same to prevent the carrying of the tube when in the positions as shown in Figs. 4, 5 and 6. By reason of the diametrically disposed lugs, 14, and 18, the various members 9 and 15 may be readily slid with relation to the member 1, the same providing handles at such points that either the hand of the operator, or if necessary, any implement may be applied to properly operate the said telescopic sections or members relatively to each other.

What is claimed is:

1. A splicing device for flexible tubular articles, composed of a male and a female member, each member consisting of a plurality of telescopic tubes slotted longitudinally, the outer tube having means for receiving and gaging the turnback of the articles to be spliced.

2. A splicing device for flexible tubular articles, composed of a male and a female member, each member consisting of a plurality of telescopic tubes provided with an article withdrawal slot; the outer tube having guiding and locking lugs fitting in the slot of the inner tube, and also having means for receiving and gaging the fold-back of the article to be spliced.

3. A splicing device for flexible tubular articles, composed of a male and female member, the male member consisting of three telescopic tubes, each provided with a longitudinal slot, the inner tube having a reduced portion forming a horn for carrying the turn-back of the article for insertion within the female member, the outer tube being provided with means for receiving and gaging the extreme turn-back of the article.

4. A splicing device for flexible tubular articles, composed of a male and female member, the female member consisting of two telescopic tubes provided each with a longitudinal slot for the insertion and withdrawal of the articles to be spliced, the outer tube having means for receiving and gaging the turn-back end of the article.

5. A splicing device for flexible tubular articles, composed of a male and female member, the male member consisting of three telescopic tubes, each provided with a longitudinal slot, the inner tube having a reduced portion forming a horn for carrying the turn-back of the article for insertion within the female member, the outer tube being provided with means for receiving and gaging the extreme turn-back of the article; and the female member consisting of two telescopic tubes provided each with a longitudinal slot for the insertion and withdrawal of the article to be spliced, the outer tube having means for receiving and gaging the turn-back end of the article.

6. A splicing device for flexible tubular articles, composed of a male and female member, the male member consisting of three telescopic tubes, each provided with a longitudinal slot, the inner tube having a reduced portion forming a horn for carrying the turn-back of the article for insertion within the female member, the outer tube being provided with means for receiving and gaging the extreme turn-back of the article, the intermediate and outer tubes being provided with guiding lugs to co-act respectively with the edges of the slots of the inner and intermediate tubes, the inner and intermediate tubes, each being provided with means for engagement with the lugs of the intermediate and outer tubes respectively to lock the respective tubes against longitudinal movement in one direction.

7. A splicing device for flexible tubular articles, composed of a male and a female member, the female member consisting of two telescopic tubes provided each with a longitudinal slot for the insertion and withdrawal of the article to be spliced, the outer tube having means for receiving and gaging the turn-back end of the article, the outer tube being provided with guiding lugs to co-act with the edges of the slot of the inner tube, a recess being provided in one edge of the slot of the inner tube to co-act with one lug of the outer tube to lock the outer tube against movement in one direction.

In testimony that I claim the foregoing as my own, I have hereto affixed my signature in the presence of two witnesses.

EDWARD A. FRANKLIN.

Witnesses:
C. R. FRANKLIN,
DESMA BOUTE.